July 17, 1962
A. W. PELLETT
3,044,391
HARVESTER
Filed May 15, 1959
3 Sheets-Sheet 1
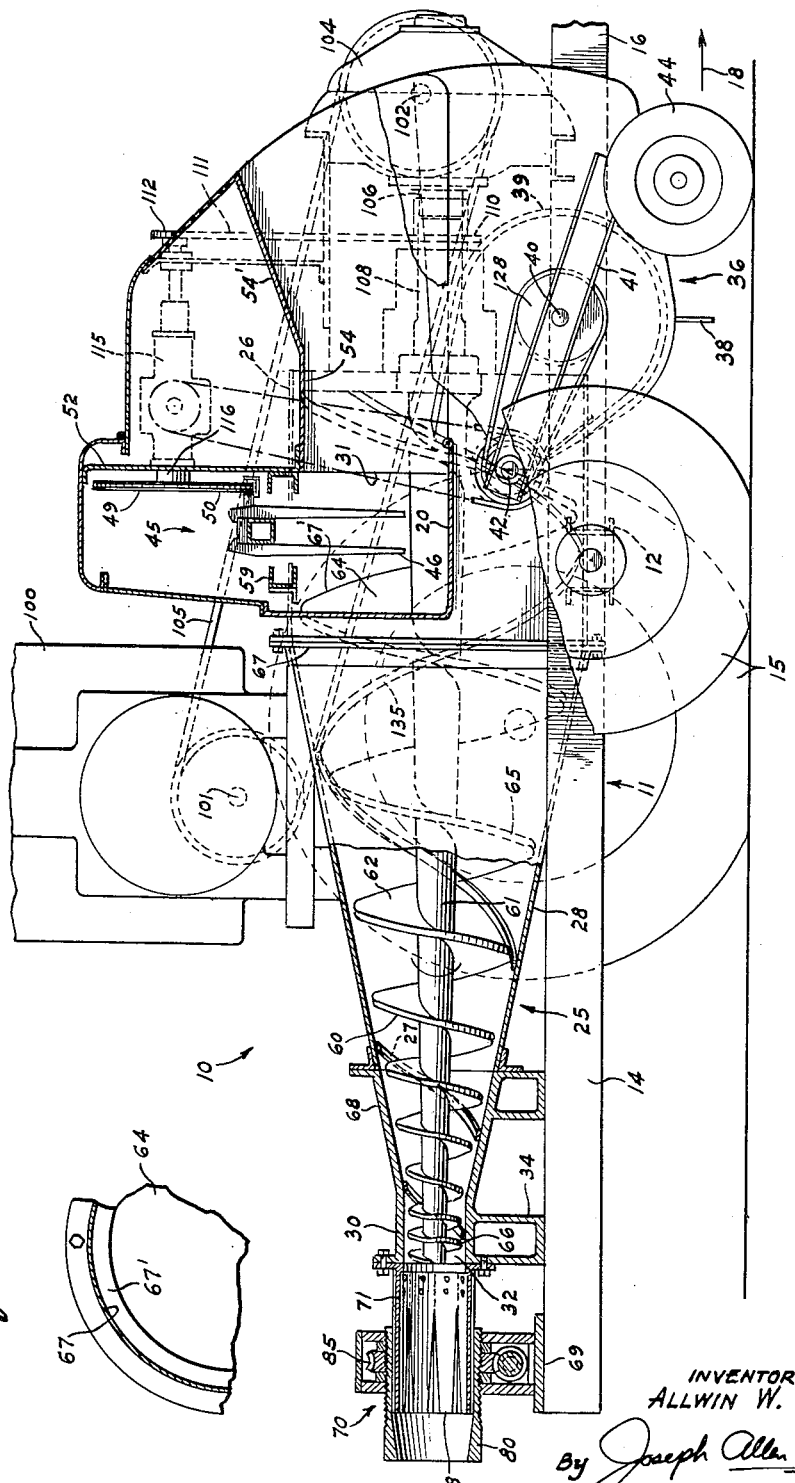
INVENTOR
ALLWIN W. PELLETT
By Joseph Allen Brown
ATTORNEY July 17, 1962  A. W. PELLETT  3,044,391
HARVESTER
Filed May 15, 1959  3 Sheets-Sheet 2
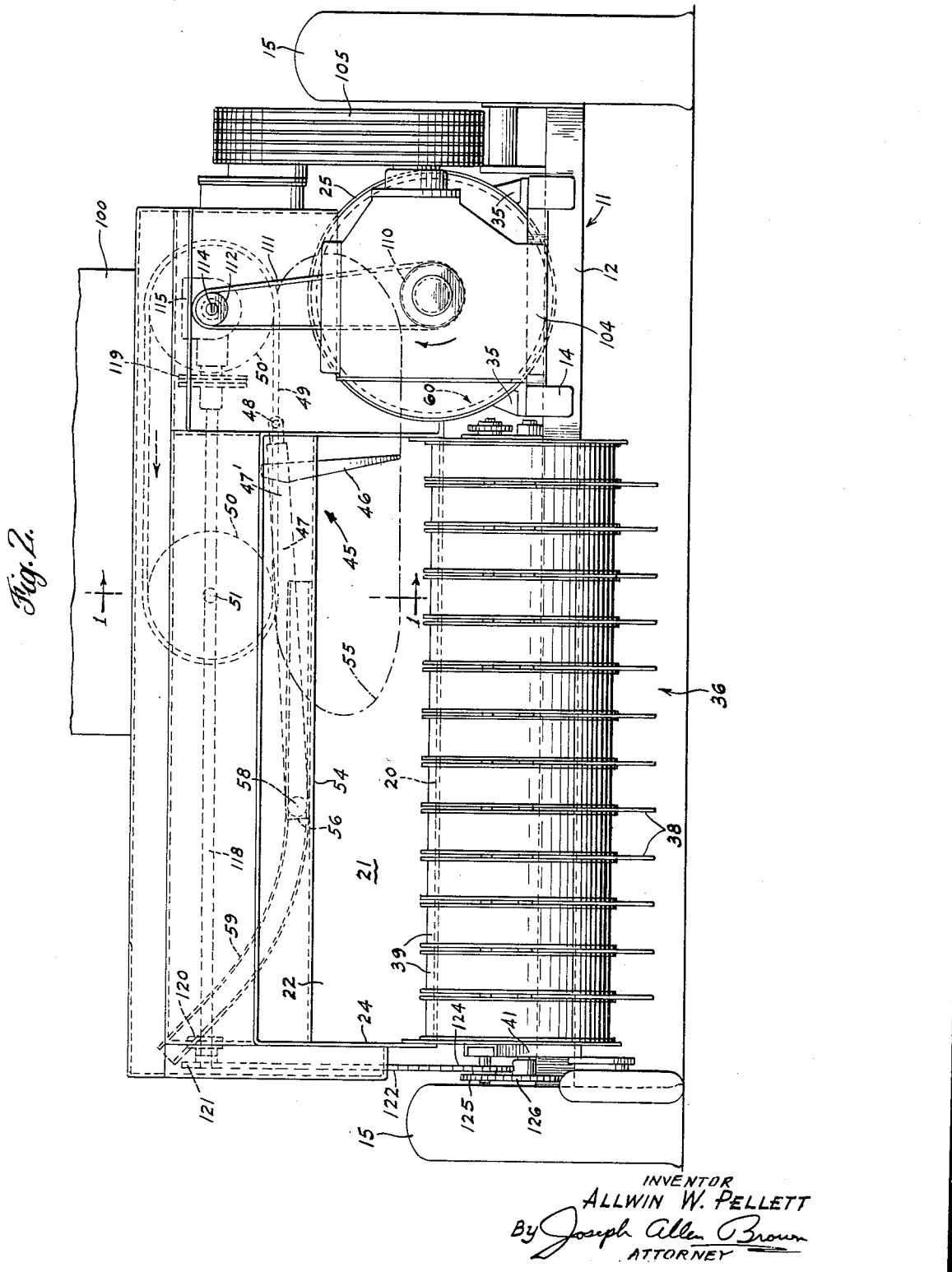
INVENTOR
ALLWIN W. PELLETT
By Joseph Allen Brown
ATTORNEY July 17, 1962  A. W. PELLETT  3,044,391
HARVESTER
Filed May 15, 1959  3 Sheets-Sheet 3
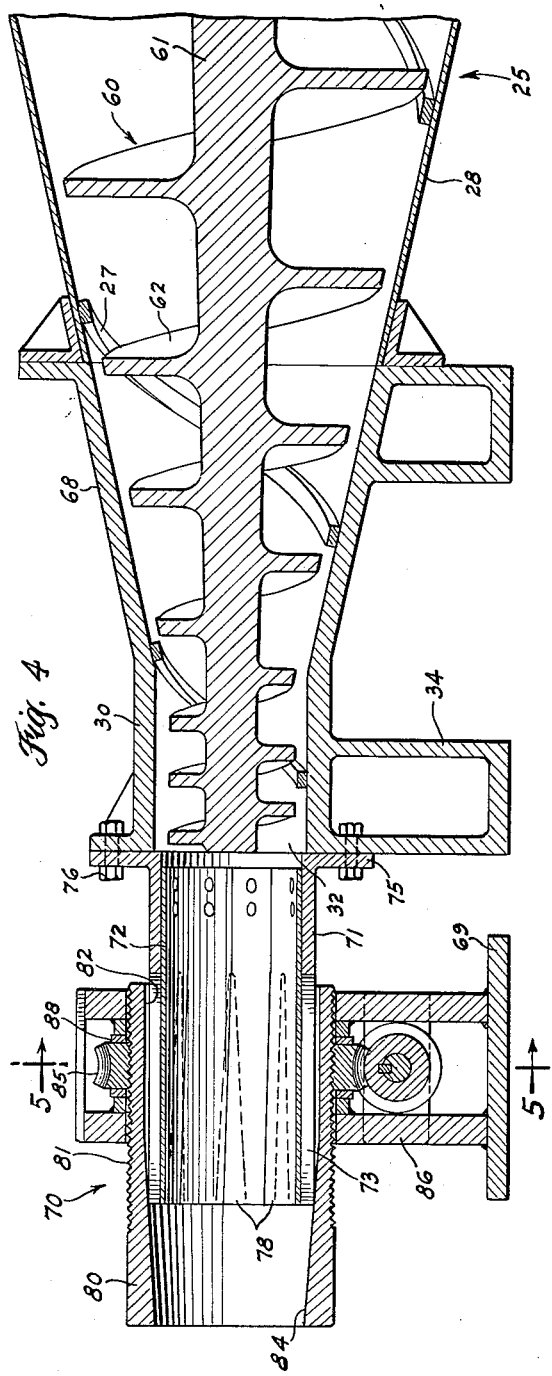
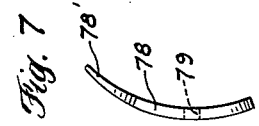
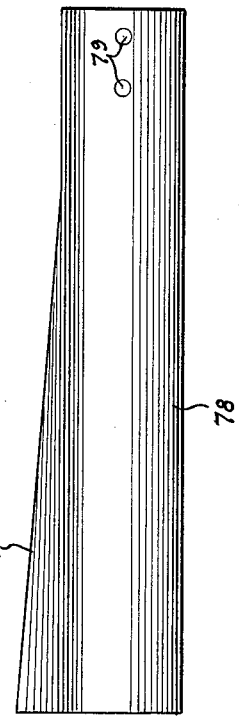
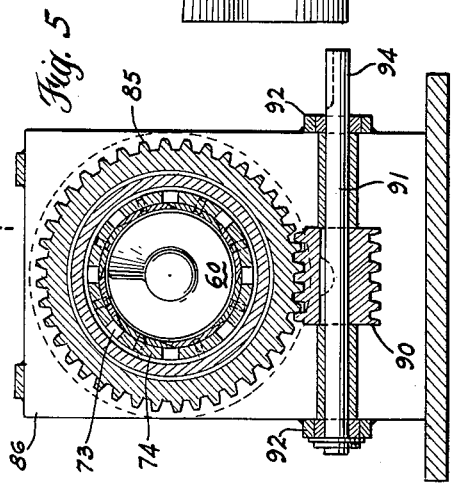
INVENTOR
ALLWIN W. PELLETT
By Joseph Allen Brown
ATTORNEY United States Patent Office 3,044,391
Patented July 17, 1962

3,044,391
HARVESTER
Allwin W. Pellett, Honeybrook, Pa., assignor to Sperry Rand Corporation, New Holland, Pa., a corporation of Delaware
Filed May 15, 1959, Ser. No. 813,517
2 Claims. (Cl. 100—143)

This invention relates to agricultural machines and more particularly to a machine adapted to gather crop material from a field and form it into pellets.

A common way to harvest hay is to use an automatic field hay baler. A baler picks up cut and windrowed crop material and conveys it into a bale chamber in separate charges which are compressed and formed into units a series of which produce a bale. Upon completion of each bale, it is banded with wire or twine and then discharged onto the ground or delivered to a trailing wagon. Even though a hay bale has considerable density, it has to be tied before it leaves the baler. Otherwise, the bale charges or slices will separate from each other when the bale is discharged.

If crop material is compressed to a greater degree than that used in baling, such as three or four times as much, the hay will bind together and will not have to be tied. It has been found, that even though crop material is compressed to the extent that it does not have to be secured with a tying medium the compressed material can be fed to animals as feed, the animals being able to break it apart and consume it.

Pelleting machines are presently available which will pick up material from a field and form it into pellets. However, such machines are generally large, cumbersome implements which grind the hay to place it in suitable condition for forming it into very small pellet pieces. Grinding the hay reduces its feed value and has other disadvantages.

One object of this invention is to provide a field machine which will operate in a continuous manner to form crop material into pellets, there being no pre-grinding or other treatment of the crop material before it is pelletized.

Another object of this invention is to provide a pelleting mechanism wherein the crop material is compressed in progressive stages.

Another object of this invention is to provide a pelleting machine in which the feeding of crop material is automatically regulated and there is provided means for altering the operation of the machine in relation to the moisture, maturity, fibre content and other factors of the material being harvested.

Another object of this invention is to provide a pelleting machine which will twist and "rope" the material as it forms it into pellets, thereby requiring less compression to form a pellet product which will hold together.

Another object of this invention is to provide adjustable means whereby the density of the pellets formed by the machine can be varied.

A further object of this invention is to provide a field machine of the character described in which knife means is provided to separate the crop material into individual charges or increments before they are compressed into pellets.

Other objects of this invention will be apparent hereinafter from the specification and from the recital in the appended claims.

In the drawings:

FIG. 1 is a longitudinal vertical section through a pelleting machine constructed according to this invention, and taken generally on the line 1—1 of FIG. 2 and looking in the direction of the arrows, a portion of the pelleting mechanism being broken away to illustrate the details of the structure thereof;

FIG. 2 is a front view of FIG. 1;

FIG. 3 is a fragmentary view showing the knife means employed in the pelleting structure;

FIG. 4 is an enlarged vertical section of the rear end of the pelleting mechanism and showing the adjustable choke means thereof;

FIG. 5 is a section taken on the line 5—5 of FIG. 4 and looking in the direction of the arrows:

FIG. 6 is an enlarged side elevation of one of the leaves of the choke means; and FIG. 7 is an end view of FIG. 6.

Referring now to the drawings by numerals of reference, and particularly to FIGS. 1 and 2, 10 denotes a pelleting machine having a frame 11 including a transverse frame member 12 and fore-and-aft extending frame structure 14. Frame 11 is supported for ground movement on wheels 15 at the respective ends of transverse member 12. The frame includes a forwardly extending drawbar 16 adapted to be connected to a tractor or other vehicle adapted to tow the machine.

Mounted on frame 11 and extending transversely relative to the forward direction of travel of the machine, as indicated by the arrow 18, FIG. 1, is a feed platform 20 which extends generally horizontally relative to the ground. The area above platform 20 constitutes a feed chamber 21 which includes an upstanding rear wall 22 and a lateral side wall 24. At the end of feed chamber 21 opposite wall 24 there is mounted on frame members 14 a fore-and-aft extending compression chamber 25 which comprises a large diameter cylindrical forward section 26, a rearwardly tapered intermediate conical portion 28 and a rearward cylindrical section 30 which is of uniform diameter. The section 26 of compression chamber 25 is cut-away at 31 to provide an inlet opening through which material can be fed into the compression chamber; and the rearward end of the chamber terminates in an outlet opening 32. The compression chamber is supported on frame members 14 by means including supports 34 and 35 affixed to the frame structure.

Mounted on frame 11 in front of feed platform 20 and extending transversely relative to the direction of travel of the machine is a conventional crop pick-up mechanism 36 which includes rotatable rake fingers 38 which operate between fore-and-aft extending laterally spaced stripper members 39. The pickup includes a cross shaft 40 supported on arms 41 pivotally connected to a cross pipe 42 carried on frame 11. As is conventional, the pick-up is mounted for up and down swinging movement about the transverse axis of the shaft 42. A ground wheel 44 is provided on the outboard end of the pick-up to cause the pick-up to rise and fall responsive to variations in ground conditions. When viewed as shown in FIG. 1, the rake fingers 38 move in a counterclockwise direction to engage crop material resting on the ground and convey it upwardly and rearwardly for deposit on feed platform 20.

Operable to convey material from the feed chamber 21 and into the compression chamber 25 is a feeding mechanism 45 comprising feed fingers 46 carried on a bar 47 extending transversely relative to the chamber 25. Bar 47 is connected at its forward end 48 through a spring 47' to an endless chain 49 extending around a pair of sprockets 50. Sprockets 50 are carried on stub shafts 51 rotatably journaled in a vertical wall 52 supported on cross member 54 which provides a roof over the rear end of the pick-up. Member 54 extends upwardly and forwardly at 54' (FIG. 1) to provide between itself and the pickup a throat for the reception of material. When chain 49 is rotated, support bar 47 is reciprocated. The feeding finger 46 travels in a path indicated by the dotted line 55 in FIG. 2. The rear end 56 of support bar 47 has laterally spaced rollers 58 which operate in arcuate channels or guide tracks 59 to support the rearward end of the feeding mechanism. In detail, the feeding mechanism described may be similar to that shown in Nolt et al., U.S. patent application Ser. No. 574,698 (now Patent No. 2,950,670) assigned to the assignee of this application.

Rotatable in chamber 25 is a compression auger 60 which comprises a shaft 61 and helical flights 62. The auger 60 extends completely through the compression chamber. It has a forward end 64 of uniform diameter operable in the forward portion 26 of the compression chamber. A section 65 of the auger extends through conical portion 28 of chamber 25. Section 65 has flights of progressively decreasing pitch and diameter. The compression auger has a rearward end 66 in portion 30 of chamber 25 in which the flights are of uniform pitch, and uniform diameter and the shaft is of uniform diameter. The shaft 61 is of progressively decreasing diameter throughout the remainder of its length. The configuration of the auger is such as to provide flights which are contiguous to the bore of the compression chamber 25.

As shown in FIG. 3, a transversely extending knife element 67 is affixed to the feed chamber 25 adjacent the opening 31 into the compression chamber. Likewise, the particular flight on the auger 60 adjacent the compression chamber entrance is provided with a knife 67' which cooperates with knife 67. As auger 60 rotates, the flights 64 convey material admitted through opening 31 toward the rear of the compression chamber. Knife element 67 moves in severing relation to knife 67' to separate the material delivered into chamber 25 into increments or charges, there being one charge for each revolution of the auger 60.

The conical section 28 of feed chamber 25 is of uniform thickness for a substantial portion of its length. However, it has a rearward end 68 which is of increased thickness. The cylindrical portion 30 of the compression chamber is of still greater thickness. Within chamber 25 is a helical rib 27 wound oppositely to the flights on auger 60. Rib 27 is provided to increase the friction between the material conveyed by auger 60 and chamber 25 to resist any tendency of the material to rotate with the auger. The surfaces of the shaft 61 and flights 62 of the auger are smooth to produce as little friction as possible between itself and the material. Thus, rotatable movement of the material conveyed by the auger is resisted by rib 27. However, the smooth surfaces of the auger keep to a minimum frictional resistance to axial movement of the material.

Mounted on a flat plate 69 on the rearward end of fore-and-aft extending frame members 14 is a choke 70 (FIGS. 4-7) which comprise an outer sleeve 71 and an inner sleeve 72. These sleeves are mounted coaxially with the axes of auger 60 and the compression chamber 25. Outer sleeve 71 has longitudinal slots 73 which thereby form rearwardly projecting fingers 74. These fingers have some resiliency whereby they can be squeezed together to reduce the inside diameter of the end of the sleeve. The forward end of sleeve 71 has an annular flange 75 connected by bolts 76 to the rearward end of compression chamber 25.

Extending inside of outer sleeve 71 are a series of longitudinally extending overlapping leaves 78, shown in detail in FIGS. 6 and 7 which form inner sleeve 72. Each leaf has a forward end provided with holes 79 through which suitable fastening members are passed to affix the leaves to outer sleeve 71. The rearward ends of the leaves are flared at 78'. Each leaf is of arcuate configuration when viewed from an end as shown in FIG. 7.

Surrounding the rearward end of outer sleeve 71 is a cam sleeve 80 having a threaded peripheral portion 81, a bore portion 82 which is of uniform diameter and a rearward bore portion 84 which is tapered. Threaded onto the periphery of the cam sleeve is a spur gear 85 carried on and rotatable in a cage 86 supported on the flat base plate 69. While the spur gear 85 is rotatable, it is prevented from axial movement by rings 88 engaging opposite sides, respectively, of the gear. Meshing with the peripheral teeth of the spur gear is a spur pinion 90 (FIG. 5) keyed to a shaft 91 rotatable in bearings 92 at the respective sides of cage 86. One end 94 of shaft 91 projects outwardly of cage 86 whereby a handle, not shown, can be connected to the shaft to rotate it.

It will be seen, that when shaft 91 is rotated, the pinion 90 connected to it will similarly rotated. The rotation of the pinion 90 is imparted to the spur gear 85. The threaded connection between the spur gear and the cam sleeve 80 causes the cam sleeve to shift axially rearwardly or forwardly depending on the rotation of the shaft 91. When the cam sleeve is moved forwardly or inwardly, the fingers 74 of outer sleeve 71 are squeezed together and they in turn operate on the leaves 78 to thereby reduce the internal diameter of the rearward end of the choke. When the cam sleeve is moved rearwardly pressure on the leaves is relieved and they are able to expand toward normal position. Thus, by rotating shaft 91 the effective diameter of the choke can be varied at will.

To operate the various components of the pelleter, an engine 100 is provided. Engine 100 has an output shaft 101 connected to the input shaft 102 of a gear box 104 through a series of endless belts 105. The gear box 104 has an output shaft 106 connected to the forward end 108 of auger shaft 61. Thus, the engine 100 operates through the gear box 104 to constantly drive the auger 60 in the compression chamber 25.

Connected to output shaft 106 of the gear box 104 is a sprocket 110 which is connected through an endless chain 111 to a sprocket 112 keyed to a shaft 114 which delivers power to a gear box 115. The gear box has an output shaft 116 connected to one of the sprockets 50 for driving the endless chain 49 for operating feed mechanism 45.

Gear box 115 has a transversely extending output cross shaft 118 (FIG. 2) which includes a slip clutch 119. The outboard end of shaft 118 is journaled in a bearing 120 in side wall 24. The outer end of shaft 118 carries a sprocket 121 which operates through an endless chain 122 to drive a sprocket 124. Sprocket 124 is coaxial with the pivotal shaft 42 for the pick-up. Connected to srpocket 124 is a sprocket 125 which operates through endless chain 126 to drive the sprocket 128 connected to the shaft 40 for the pick-up reel.

As indicated by the dotted line 55, the fingers 46 of the feed mechanism move in a path which intersects the paths of the flights of the auger 60. To preclude interference between the fingers 46 and the auger flights 62, the drives for the respective mechanisms are timed. The fingers are adapted to pass into and out of the chamber 25 in timed relation with the rotation of the auger whereby the fingers avoid striking the auger flights. The driving relationship between these parts is constant. While there is a slip clutch 119 in the drive mechanism, such clutch is disposed between the power drive and the pick-up. Thus, the pick-up is allowed to slip upon overload. However, the drive to the auger and the feeder may not slip relative to each other.

In operation, the feeding mechanism of the machine delivers material intermittently to the compression chamber 25. With each sweep of the fingers 46, material is taken from feed chamber 21 and conveyed between successive forward auger flights 64. The auger rotates constantly. Each charge of material, as it is delivered rearwardly into the conical portion 28 of the feed chamber is cut off by the cooperating knives 67—67'. Once the material is within portion 28 of the compression chamber, the auger flights compress the crop material as they convey it axially through the chamber. As previously stated, to prevent the material from rotating with the auger as it rotates, the helical rib 27 is provided inside he compression chamber. This rib is wound oppositely to the direction of rotation of the auger 60. In view of the decreasing pitch, decreasing diameter and decreasing shaft diameter of the auger 60, as the material is conveyed towards the outlet 32 it is compressed. The cylindrical portion 30 provides a dwell or straightaway which allows some "setting" of the material before it is discharged into the choke 70. Generally speaking, the crop material is compressed three or four to one from the time it enters the compression chamber until it is discharged through the outlet 32.

The choke 70 provides means whereby back pressure can be applied to the discharge of material. Using the choke 70, the machine operator can adjust the mechanism to take into account the nature of the material being pelletized. Materials having a high moisture content require a different adjustment than materials having a low moisture content. The same applies to the fibre content of the material being handled.

The auger 60 and rib 27 coact to produce a twisting of the stems and fibres of the material as it is axially conveyed. This twisting tends to "rope" the product giving it a greater tendency to hold together than material which is sought to be bound together using pressure alone. For example, while seventy pounds per cubic inch of pressure may be required for forming a pellet of a given material using pressure alone, forty-five pounds of pressure on the same material will produce as good a pellet using the structure of this invention because of the roping action developed. This results in a machine of greater capacity than other machines and operable with less power than would be required otherwise.

With the structure described, the material enters the machine and is formed into pellets in a continuous stream. Although not shown, some type of endless conveyor would be provided in conjunction with the machine to receive the pellets as they are discharged through the chokes 70. The pellets can then be conveyed into a trailing wagon or some suitable receptacle. While the size of the pellets may be of any desired diameter, it has been found that pellets in the range of about five inches in diameter are preferable. The structure shown in the drawings is adapted to produce pellets about this size.

While this invention has been described in connection with a particular embodiment thereof, it will be understood that it is capable of further modification and this application is intended to cover any variations or uses following the principle of this invention or such departure as come within known or customary practice in the art to which the invention pertains or as come within the scope of the invention or the limits of the appended claims.

Having thus described my invention, what I claim is:

1. A machine for forming non-comminuted hay into pellets comprising an elongate compression chamber having an inlet opening at a forward end and an outlet opening at a rear end, said chamber having a conical portion extending from an end of larger diameter adjacent said inlet opening to an end of smaller diameter spaced from said outlet opening, the portion of said chamber from said end of smaller diameter to said outlet opening being generally of uniform diameter, a continuous flight rotatable compression auger extending through said chamber, said auger having a first section within said conical portion having flights which are of decreasing pitch and diameter and a shaft of progressively decreasing diameter, and a second section within said cylindrical portion having flights of generally uniform pitch and diameter, means for rotating said auger whereby hay deposited in said inlet is conveyed rearwardly and toward said outlet, the flights of both auger sections being in such proximity to said chamber that as material is conveyed rearwardly, forward movement of material between the flights and chamber is resisted, and a helical rib on the inside of said chamber wound oppositely to the flights on said auger to retard rotatable movement of the hay as it is conveyed by the auger.

2. A machine for forming non-comminuted hay into pellets as recited in claim 1 wherein receiving means comprising an expandable and contractible tubular choke is connected to said chamber in communication with said outlet opening to receive material discharged from the outlet opening, and means being provided for operating said choke.

References Cited in the file of this patent

UNITED STATES PATENTS

| 478,279 | Gardiner | July 5, 1892 |
| 561,133 | Roop et al. | June 2, 1896 |
| 563,543 | Alter | July 7, 1896 |
| 572,455 | Sigmund | Dec. 1, 1896 |
| 930,095 | Seagrave | Aug. 3, 1909 |
| 1,045,184 | Randleman | Nov. 26, 1912 |
| 1,257,559 | Webb | Feb. 26, 1918 |
| 2,210,006 | Rieske | Aug. 6, 1940 |
| 2,505,125 | List | Apr. 25, 1950 |
| 2,859,688 | Nolt | Nov. 11, 1958 |

FOREIGN PATENTS

| 26,177 | Germany | Feb. 27, 1884 |
| 250,465 | Switzerland | June 1, 1948 |
| 193,291 | Austria | Nov. 25, 1957 |